UNITED STATES PATENT OFFICE 2,347,763

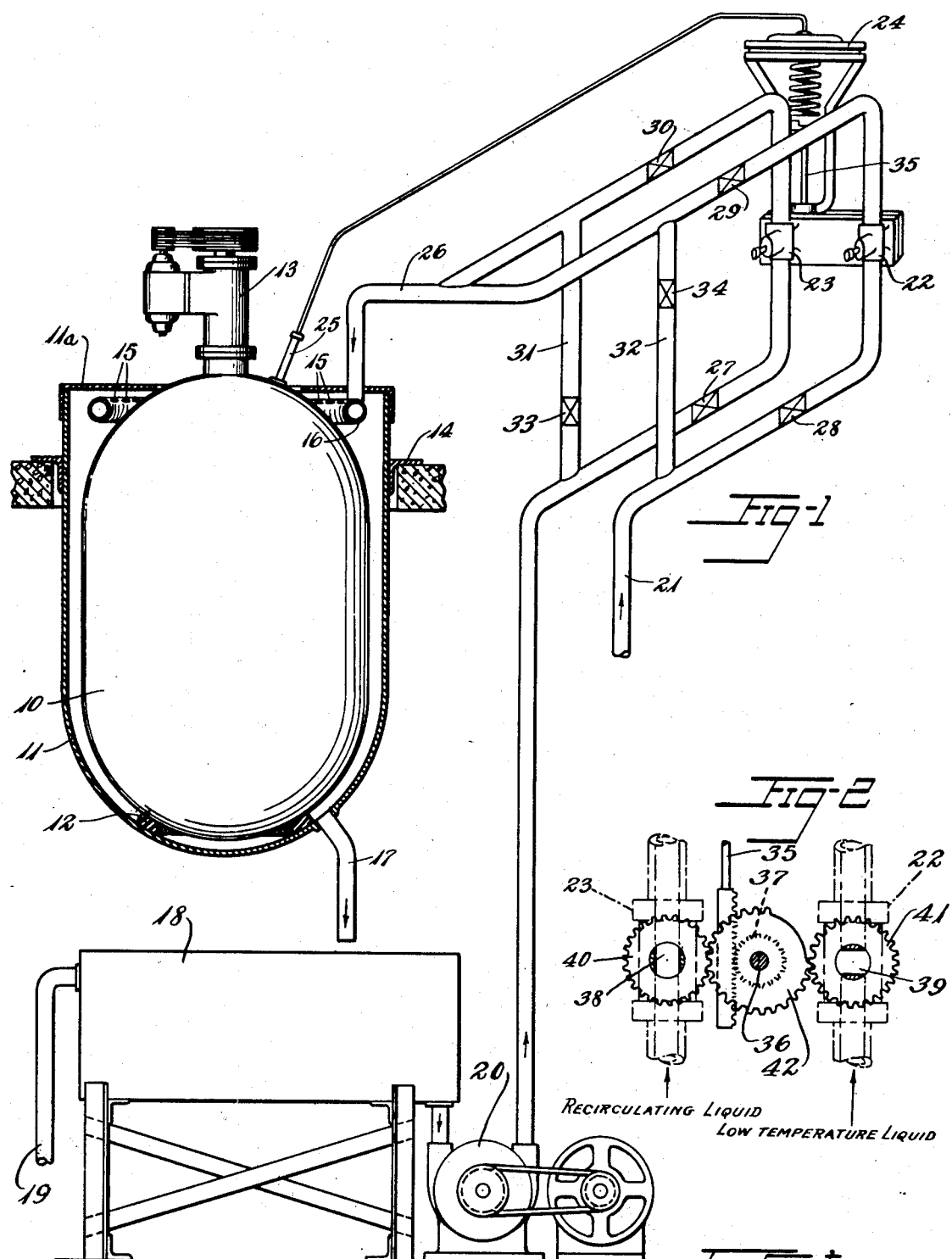

TEMPERATURE CONTROL SYSTEM

Willard F. Bixby, Akron, Ohio, assignor to The B. F. Goodrich Company, New York, N. Y., a corporation of New York Application April 12, 1941, Serial No. 388,345

1 Claim. (Cl. 23—260)

This invention relates to a method for controlling the temperature of a fluid container within close limits and pertains specifically to the circulation of a liquid heat exchange medium, the temperature of which may be varied over a wide range.

Circulation of a liquid heat exchange medium through a coil or jacket or over the external surface of a container has long been used as a method of controlling the temperature of vessels containing liquids or solutions of solids in liquids, chemical reagents which either absorb or evolve heat in the process of reaction, etc. The problem of controlling the temperature of chemical reactions, however, in which the amount of heat absorbed or evolved varies within wide limits during the course of the reaction, has usually involved the use of large volumes of heat exchange medium, entailing considerable expense.

I have now discovered a method for securing excellent temperature control in such cases, which comprises employing a substantially constant flow of a heat exchange medium, the temperature of which may be varied rapidly over a wide range. When the rate of evolution or absorption of heat from the vessel is low, the rate of flow of heat exchange medium may be decreased in order to obtain economy of operation without sacrificing any of the effectiveness of the control of temperature within the vessel. Such a decrease in the rate of flow of the heat exchange medium is not necessary for the operation of my system, however.

One embodiment of my invention is shown in the accompanying drawing in which Fig. 1 is a schematic representation of the temperature control system as a whole; and Fig. 2 is a detailed section of the valve mechanism.

In Fig. 1 the vessel 10, which is to be maintained at constant temperature, is supported in the jacket 11 by means of the resilient ring 12. The vessel may be of any suitable construction, preferably of metal; if corrosive chemicals are to be held therein it may be lined with glass or enamel or made of other resistant material, but if the heat exchange medium is to be circulated outside the vessel the walls should be constructed so as to permit a high heat transfer. A stirrer 13 or some other means for agitating the contents of the vessel is usually desirable in order to maintain a uniform temperature throughout the interior of the vessel. The jacket 11 is conveniently supported by brackets at 14, and may be supplied with a cover 11a.

The heat exchange medium flows out of the orifices 15 in the upper surface of the conduit 16 which encircles the vessel near the top, and after passing over the external surface of the vessel as a uniform coherent film of liquid, collects in the jacket above the ring 12 and thence passes out through the drain 17. Any suitable liquid may be used as the heat exchange medium; water, alcohol, glycerine, glycol, or mixtures thereof, oil, a mixture of diphenyl and diphenyl-ether known as Dowtherm, and other similar materials, especially those with high specific heats, are all satisfactory. The most convenient and least expensive medium for temperatures below 100° C., of course, is water.

The drain 17 should be large enough so that there is no appreciable build-up of liquid in the jacket. It is desirable to maintain a free-flowing coherent film of liquid over the entire external surface of the container in order to obtain optimum control of the temperature.

In the case of exothermic reactions, the stream of liquid heat exchange medium, as it enters conduit 16, is a mixture of two streams of liquid in the correct proportion, the one at a temperature approximately equal to that of the vessel whose temperature is to be controlled, the other lower. A part of the liquid flowing out of drain 17 may be recirculated as the relatively high temperature liquid.

In the case of endothermic reactions a mixture of recirculated liquid and a higher temperature liquid may be used, or a mixture of the low temperature liquid and a high temperature liquid. By high temperature liquid is meant a liquid the temperature of which is substantially above the temperature of the contents of the vessel.

A tank 18 with an overflow 19 for the excess liquid is provided to furnish a supply of recirculating liquid at a relatively uniform temperature to a pump 20 which circulates it back to the conduit 16. The low temperature supply of temperature control medium enters the system at 21. Regulation of the relative amounts of the low and high temperature media needed to secure the desired temperature is accomplished by two rotary port valves 22 and 23, which are actuated by a diaphragm 24 which is in turn controlled by the temperature within the vessel itself by means of a thermostatic control 25 which may be placed at any suitable point within the vessel. In order to render the operation of the valves more sensitive to slight changes in the temperature of the contents of the container, any of the usual amplifying devices may be introduced between the thermostat bulb 25 and the diaphragm 24. The two streams, in the correct proportions, are mixed at 26 before entering the distributor 16. In operation the valves 27, 28, 29 and 30 are open and the by-passes 31 and 32 are closed by valves 33 and 34. Provision is made for manual operation of the system by closing valves 27, 28, 29, and 30 and regulating the flow by means of the valves 33 and 34.

In Fig. 2, which shows the relation of the movable parts of the valves 22 and 23, a rack 35, actuated by the diaphragm 24, interacts with pinion 37 which in turn is fixed to gear 42. The valve ports 38 and 39 are fixed directly to gears 40 and 41 which are actuated by gear 42 in such manner that when 38 is completely open, 39 is completely closed, and so that when both are partly open the total amount of liquid flowing through both of them is equal to the amount flowing through either one of them alone when it is completely open. In the system illustrated, where recirculated liquid is used instead of a fresh supply of heated liquid, part of gear 42 is without teeth, as shown in the drawing, so that when the temperature of the vessel drops below the desired level, the flow of recirculated liquid, the temperature of which is necessarily also below the desired level, may be shut off without opening port 39 and admitting liquid at still a lower temperature. That is, the flow of liquid may be shut off completely when the temperature within the vessel drops too low. When the temperature in the vessel rises too high, port 38 is completely closed, and 39 is completely open to admit the maximum amount of low temperature liquid to the conduit 16.

The modification of my invention shown in the accompanying drawing is adapted for controlling the temperature of a container which evolves heat. Whenever the temperature inside the vessel 10 rises above the desired level, the control 25 acts upon diaphragm 24 to force down the diaphragm and, in turn, the rack 35. Referring to Fig. 2, when the rack 35 moves downward, port 38 is partly closed, shutting off the recirculating liquid, and port 39 is opened, admitting a stream of cold liquid which cools vessel 10. If, because of excessive evolution of heat, the temperature in vessel 10 is not sufficiently adjusted by this initial lowering of the temperature of the cooling medium, the rack 35 is forced down still farther. Maximum cooling effect is attained when port 38 is completely closed, and port 39 completely open. A sufficient factor of safety should be allowed so that the maximum amount of cooling liquid will never have to be used under ordinary circumstances.

If, on the other hand, the rate of evolution of heat decreases, so that the temperature within the container tends to fall below the desired level because of the excessive amount of liquid cooling it, the thermostatic control moves the rack 35 upward, partially closing port 39 and opening port 38, and if this is continued the condition shown in Fig. 2 is again attained. If the rate of evolution of heat is so small that it is insufficient to maintain the temperature in the container at the desired level even with the entire flow of heat exchange medium consisting of recirculated liquid, the temperature of which is nearly the same as that in the vessel, rack 35 is further actuated upwardly to turn valve 23 past its fully open position so as partially to close port 38. Port 39 is not simultaneously opened in this case because of the absence of teeth on one segment of gear 42, as shown.

It is apparent from this description of the operation of the device that the temperature of the heat-exchange medium need not be precisely that of the contents of the vessel. In general, the heat-exchange medium will need be cooler than the contents of the vessel when an exothermic reaction is taking place within the vessel, and warmer when the reaction is endothermic. If the exothermic reaction will not take place except at elevated temperatures, the modification of my invention illustrated cannot be used to heat the reagents to the desired temperature. Some other means should be used to heat the reaction from room temperature to the desired temperature and to maintain it at that level until the reaction begins to evolve heat itself. The difference in temperature between the liquids inside and outside of the container is proportional to the rate at which heat is evolved or absorbed and is controlled by the thermostatic regulator. In the case of endothermic reactions, of course, the recirculated heat-exchange medium is mixed with a liquid at high temperature, that is, at a temperature substantially above that of the contents of the vessel, rather than with a low temperature liquid as in the case of exothermic reactions.

Although I have herein disclosed specific embodiments of my invention, I do not intend to limit myself solely thereto, but only as indicated by the spirit and scope of the appended claim.

I claim:

In combination with a chemical reaction vessel, means for controlling the temperature of the contents of the vessel comprising a tank below the vessel for reception of temperature control liquid, temperature control means including a pipe line having a pump and a valve therein for recirculating a portion of said temperature control liquid, a fresh liquor supply pipe line having a valve therein connected to said first pipe line and communicating with a source of supply of fresh liquid for introducing fresh temperature control liquid into the circulating system, gears operatively connected to said valves, a third gear having an interrupted thread operatively connected to both said gears, thermostatic means operatively connected to said third gear and responsive to temperature conditions in said reaction vessel, said valves and gears being so interconnected and arranged as to cause the valve in said fresh liquor supply line to open and the valve in said temperature control means to close as the temperature in said reaction vessel increases and to cause the valve in said fresh liquor supply line to close and the valve in said temperature control means to open as the temperature in said reaction vessel decreases and to move the valve in said temperature control means toward the closed position after the valve in said fresh liquor supply line has fully closed.

WILLARD F. BIXBY.